(12) United States Patent
McCall et al.

(10) Patent No.: US 7,941,105 B1
(45) Date of Patent: May 10, 2011

(54) REFLECTION CANCELLATION CIRCUIT FOR A RADIO FREQUENCY POWER AMPLIFIER

(75) Inventors: Scott McCall, Colfax, NC (US); Jon D. Jorgenson, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 957 days.

(21) Appl. No.: 11/560,722

(22) Filed: Nov. 16, 2006

(51) Int. Cl.
*H04B 1/04* (2006.01)

(52) U.S. Cl. .................. 455/114.2; 330/10.3; 330/149

(58) Field of Classification Search ............. 455/114.2
See application file for complete search history.

(56) References Cited

U.S. PATENT DOCUMENTS

| 5,258,722 | A | * | 11/1993 | Jeffers | ............. | 330/149 |
| 2008/0079547 | A1 | * | 4/2008 | Alicot et al. | ............. | 340/10.3 |

\* cited by examiner

*Primary Examiner* — Duc Nguyen
*Assistant Examiner* — Ajibola Akinyemi
(74) *Attorney, Agent, or Firm* — Withrow & Terranova, P.L.L.C.

(57) ABSTRACT

The present invention is an RF cancellation circuit located between the output of a power amplifier and downstream circuitry, such as a transmitting antenna. The RF cancellation circuit cancels reflections resulting from antenna impedance mismatches, thereby presenting a constant load impedance to the output of the power amplifier. The RF cancellation circuit extracts a portion of the reflected signal, phase-shifts by 180 degrees and amplifies the extracted portion of the reflected signal to create a cancellation signal, and then cancels the balance of the reflected signal by adding in the cancellation signal. Directional circuitry is used to process the reflected signals without interfering with normal transmitted signals. Presenting a constant load impedance to the output of the power amplifier helps facilitate compliance with total radiated power into load mismatch specifications.

19 Claims, 5 Drawing Sheets

REFLECTION CANCELLATION CIRCUIT FOR A RADIO FREQUENCY POWER AMPLIFIER

FIELD OF THE INVENTION

The present invention relates to radio frequency (RF) power amplifiers and related circuitry used in RF communications systems.

BACKGROUND OF THE INVENTION

Transmitters in many wireless communications devices must meet total radiated power (TRP) specifications. To meet the TRP specifications, the transmitter power amplifier (PA) final stage may require a constant load impedance. In reality, the load impedance may vary due to changing antenna conditions caused by proximity of the antenna to foreign metallic objects, the user's body, or other factors. Load impedance variations, which may cause impedance mismatches into the antenna, may cause part of a transmitted signal from the PA to be reflected back into the output of the PA, which may reduce the output power of the PA. Certain PA architectures, such as quadrature PAs, may reduce susceptibility to load impedance variations; however, if the reflected signal could be eliminated, total radiated power could be optimized over a wide range of antenna loading conditions. As such, there is a need for an RF cancellation circuit to cancel reflected signals from a transmitting antenna.

SUMMARY OF THE INVENTION

The present invention is an RF cancellation circuit located between the output of a power amplifier and downstream circuitry, such as a transmitting antenna. The RF cancellation circuit cancels reflections resulting from antenna impedance mismatches, thereby presenting a relatively constant load impedance to the output of the power amplifier. The RF cancellation circuit extracts a portion of the reflected signal, phase-shifts by 180 degrees and amplifies the extracted portion of the reflected signal to create a cancellation signal, and then cancels the balance of the reflected signal by adding in the cancellation signal. Directional circuitry is used to process the reflected signals without interfering with normal transmitted signals. Presenting a constant load impedance to the output of the power amplifier helps facilitate compliance with total radiated power into load mismatch specifications.

In one embodiment of the present invention, a dual directional coupler may be used to extract a portion of the reflected signal, phase-shift the extracted portion, and combine the cancellation signal with the balance of the reflected signal to cancel both signals. An external amplifier creates the cancellation signal by amplifying the phase-shifted extracted portion of the reflected signal. In an alternate embodiment of the present invention, two directional couplers may be used in place of the dual directional coupler. The 180 degree phase-shift may be applied either before amplification or after amplification.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is an RF cancellation circuit located between the output of a power amplifier and downstream circuitry, such as a transmitting antenna. The RF cancellation circuit cancels reflections resulting from antenna impedance mismatches, thereby presenting a constant load impedance to the output of the power amplifier. The RF cancellation circuit extracts a portion of the reflected signal, phase-shifts by 180 degrees and amplifies the extracted portion of the reflected signal to create a cancellation signal, and then cancels the balance of the reflected signal by adding in the cancellation signal. Directional circuitry is used to process the reflected signals without interfering with normal transmitted signals. Presenting a constant load impedance to the output of the power amplifier helps facilitate compliance with total radiated power into load mismatch specifications.

In one embodiment of the present invention, a dual directional coupler may be used to extract a portion of the reflected signal, phase-shift the extracted portion, and combine the cancellation signal with the balance of the reflected signal to cancel both signals. An external amplifier creates the cancellation signal by amplifying the phase-shifted extracted portion of the reflected signal. In an alternate embodiment of the present invention, two directional couplers may be used in place of the dual directional coupler. The 180 degree phase-shift may be applied either before amplification or after amplification.

Figure 1:
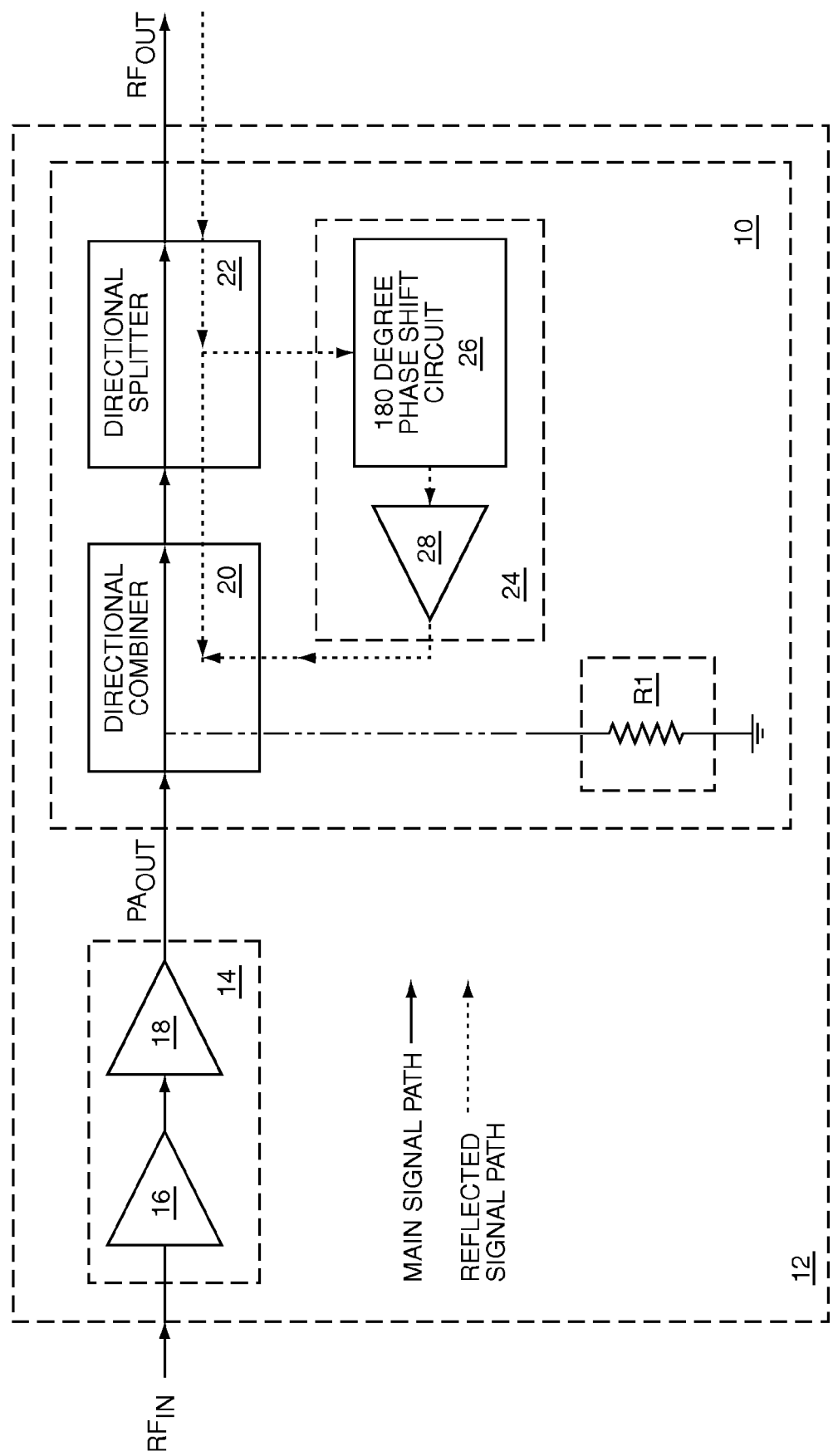
FIG. 1 shows one embodiment of the present invention used in an RF power amplifier circuit, wherein the 180 degree phase-shift is applied before amplification.

The present invention is an RF reflection cancellation circuit 10, as shown in FIG. 1. The RF reflection cancellation circuit 10 is part of an RF power amplifier circuit 12, which includes an RF power amplifier 14. The RF power amplifier 14 includes one or more driver stages 16 feeding a final stage 18. An RF input signal $RF_{IN}$ is received and amplified by the driver stages 16, which feed the final stage 18, which adds further amplification to create a power amplifier output signal $PA_{OUT}$. The RF reflection cancellation circuit 10 includes a directional combiner 20, which receives and forwards the power amplifier output signal $PA_{OUT}$ through a main signal path into a directional splitter 22. The directional splitter 22 forwards the power amplifier output signal $PA_{OUT}$ through a main signal path to create an RF output signal $RF_{OUT}$, which feeds downstream circuitry, such as a transmitting antenna (not shown). Impedance mismatches in the downstream circuitry may cause a portion of the RF output signal $RF_{OUT}$ to be reflected back into the directional splitter 22. The present invention cancels the effects of the reflected signal. The reflected signal is split by the directional splitter 22 into a cancellation signal and the balance of the reflected signal. The balance of the reflected signal travels back down the main signal path. The cancellation signal feeds RF amplifier and phase-shift circuitry 24, which applies a 180 degree phase-shift and amplifies the cancellation signal to create an amplified phase-shifted cancellation signal. The directional combiner 20 receives and combines the amplified phase-shifted cancellation signal with the balance of the reflected signal to cancel both signals.

By canceling both signals, the load impedance presented to the output of the final stage 18 is stable. The load impedance may be represented as a load resistor R1. FIG. 1 shows the transmitted output signal with a solid line, and the reflected signals with a dashed line. In one embodiment of the present invention, the RF amplifier and phase-shift circuitry 24 includes a 180 degree phase-shift circuit 26, which receives the cancellation signal and provides a 180 degree phase-shifted cancellation signal to an RF amplifier 28. The RF amplifier 28 amplifies the 180 degree phase-shifted cancellation signal to create the amplified phase-shifted cancellation signal. The directional combiner 20 does not affect forward signals in the main signal path; however, reverse signals in the main signal path are combined with signals from a directional port. The directional splitter 22 does not affect forward signals in the main signal path; however, a reverse signal in the main signal path is split into a signal sent to a directional port and the balance of the reverse signal traveling back down the main path.

The coupling coefficient of the directional splitter 22 is defined as the ratio of the amplitude of the received reverse signal divided by the amplitude of the signal sent to the directional port. In some embodiments of the present invention, the coupling coefficient will exceed 3 db, which is equal to approximately 1.7. The amplifier gain of the RF amplifier 28 is defined as the ratio of the amplitude of the amplified phase-shifted cancellation signal divided by the amplitude of the cancellation signal. If the directional combiner 20 has a combining ratio that is similar to the coupling coefficient, the amplifier gain may be equal to two times the coupling coefficient. In an exemplary embodiment of the present invention, the coupling coefficient may be approximately 15 db, and the amplifier gain may be approximately 30 db.

Figure 2:
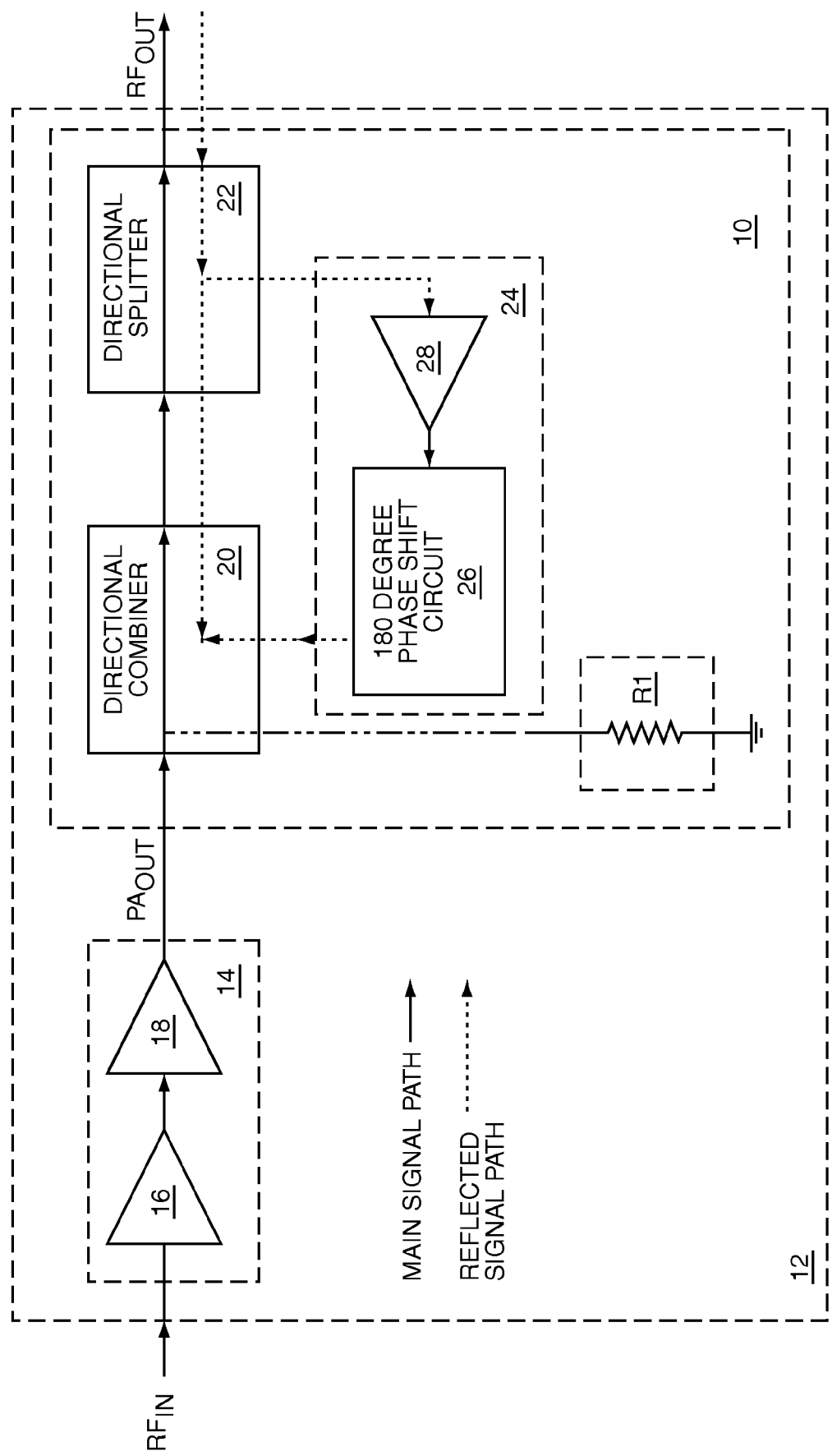
FIG. 2 shows another embodiment of the present invention used in the RF power amplifier circuit, wherein the 180 degree phase-shift is applied after amplification.

FIG. 2 shows another embodiment of the RF amplifier and phase-shift circuitry 24. The 180 degree phase-shift is applied after amplification. The RF amplifier 28 amplifies the cancellation signal to create an amplified cancellation signal. The 180 degree phase-shift circuit 26 receives the amplified cancellation signal, applies a 180 degree phase-shift, and provides the amplified phase-shifted cancellation signal.

Figure 3:
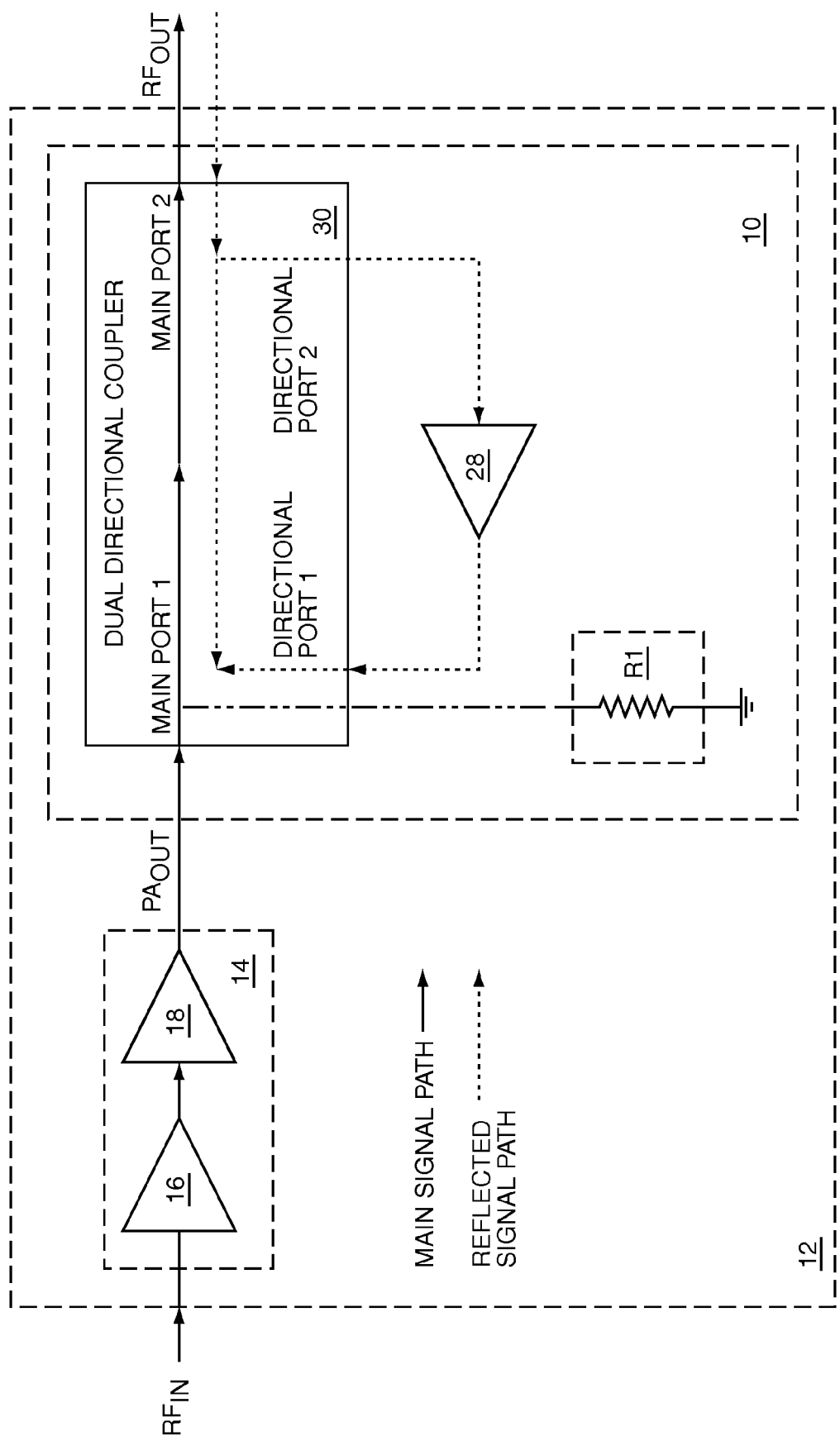
FIG. 3 shows a dual directional coupler providing the functions of reflected signal extraction, phase-shifting, and combining.

In FIG. 3, functions provided by the directional combiner 20, directional splitter 22, and the 180 degree phase-shift circuit 26 are provided by a dual directional coupler 30. A typical dual directional coupler provides a main signal path between a main port 1 and a main port 2. In particular, a signal driven into main port 1 will be split such that part of the signal will be routed to a directional port 1. A signal driven into main port 2 will be split such that part of the signal will be routed to a directional port 2. A signal driven into main port 1 will be isolated from directional port 2. A signal driven into main port 2 will be isolated from directional port 1. The behavioral characteristics of a typical dual directional coupler lend themselves to the RF reflection cancellation circuit 10. The only additional element needed is the RF amplifier 28. Main port 1 receives the power amplifier output signal $PA_{OUT}$. Main port 2 provides the RF output signal $RF_{OUT}$ and receives any reflected signal due to impedance mismatches. Directional port 2 provides the phase-shifted cancellation signal, and directional port 1 receives the amplified phase-shifted cancellation signal. In a different embodiment of the dual directional coupler 30, directional port 2 provides the cancellation signal, without any phase-shift, and directional port 1 receives and applies a phase-shift to the amplified cancellation signal.

Figure 4:
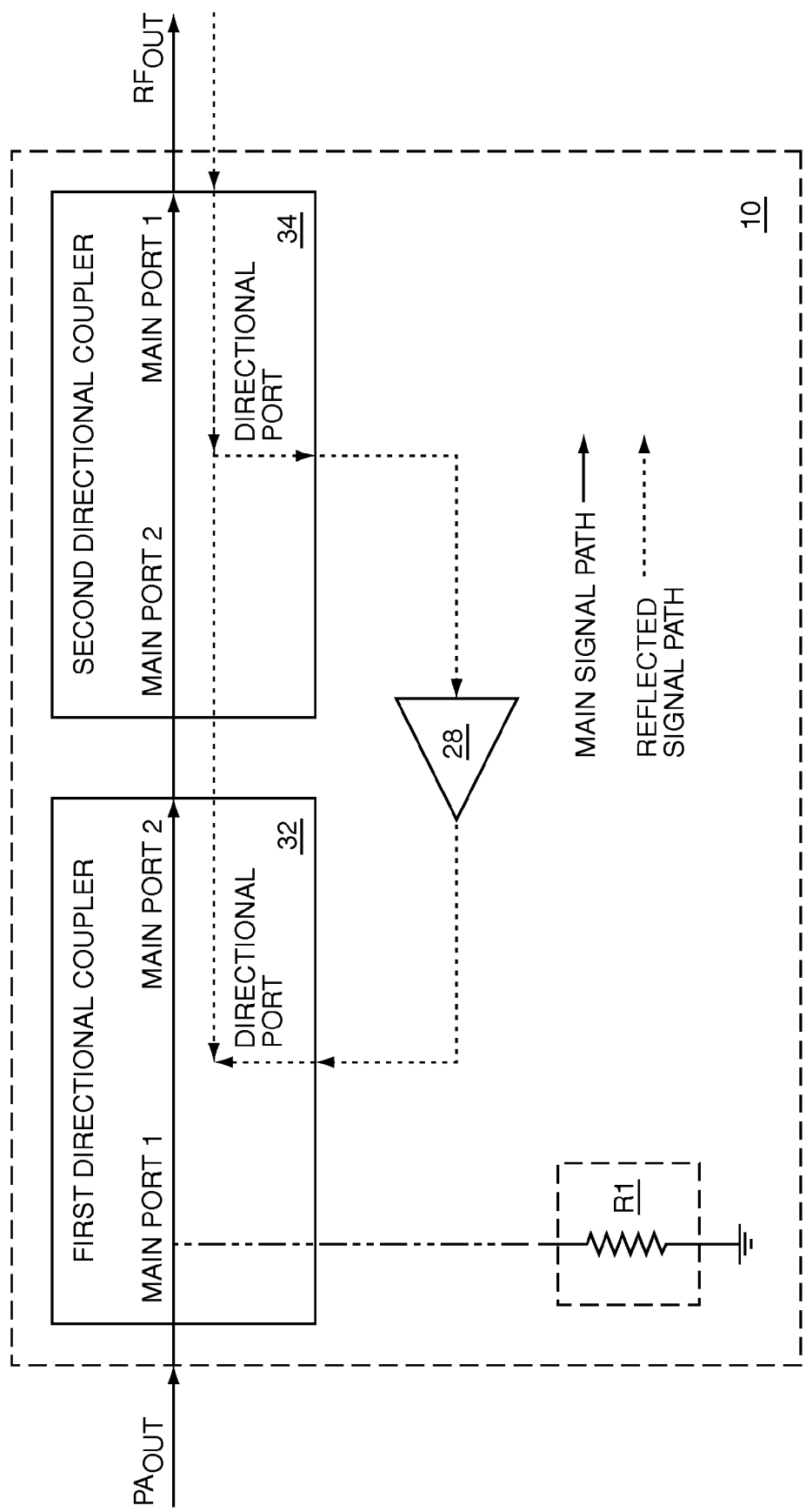
FIG. 4 shows two directional couplers in place of the dual directional coupler of FIG. 3.

FIG. 4 shows two directional couplers in place of the dual directional coupler 30 of FIG. 3. A first directional coupler 32 replaces the directional combiner 20. A second directional coupler 34 replaces the directional splitter 22. The 180 degree phase-shift previously provided by the 180 degree phase-shift circuit 26 is provided by either the first directional coupler 32 or the second directional coupler 34, depending on whether inverting or non-inverting directional couplers are used. A typical directional coupler provides a main signal path between a main port 1 and a main port 2. A signal driven into main port 1 will be split such that part of the signal will be routed to a directional port. Main port 1 of the first directional coupler 32 receives the power amplifier output signal $PA_{OUT}$, which is forwarded to main port 2 of the first directional coupler 32. Main port 2 of the second directional coupler 34 receives the forwarded power amplifier output signal $PA_{OUT}$, which is forwarded to main port 1 of the second directional coupler 34 to provide the RF output signal $RF_{OUT}$ and receive any reflected signal due to impedance mismatches. The directional port of the second directional coupler 34 provides the phase-shifted cancellation signal, and the directional port of the first directional coupler 32 receives the amplified phase-shifted cancellation signal. In a different embodiment of the directional couplers 32, 34, the directional port of the second directional coupler 34 provides the cancellation signal, without any phase-shift, and the directional port of the first directional coupler 32 receives and applies a phase-shift to the amplified cancellation signal.

Figure 5:
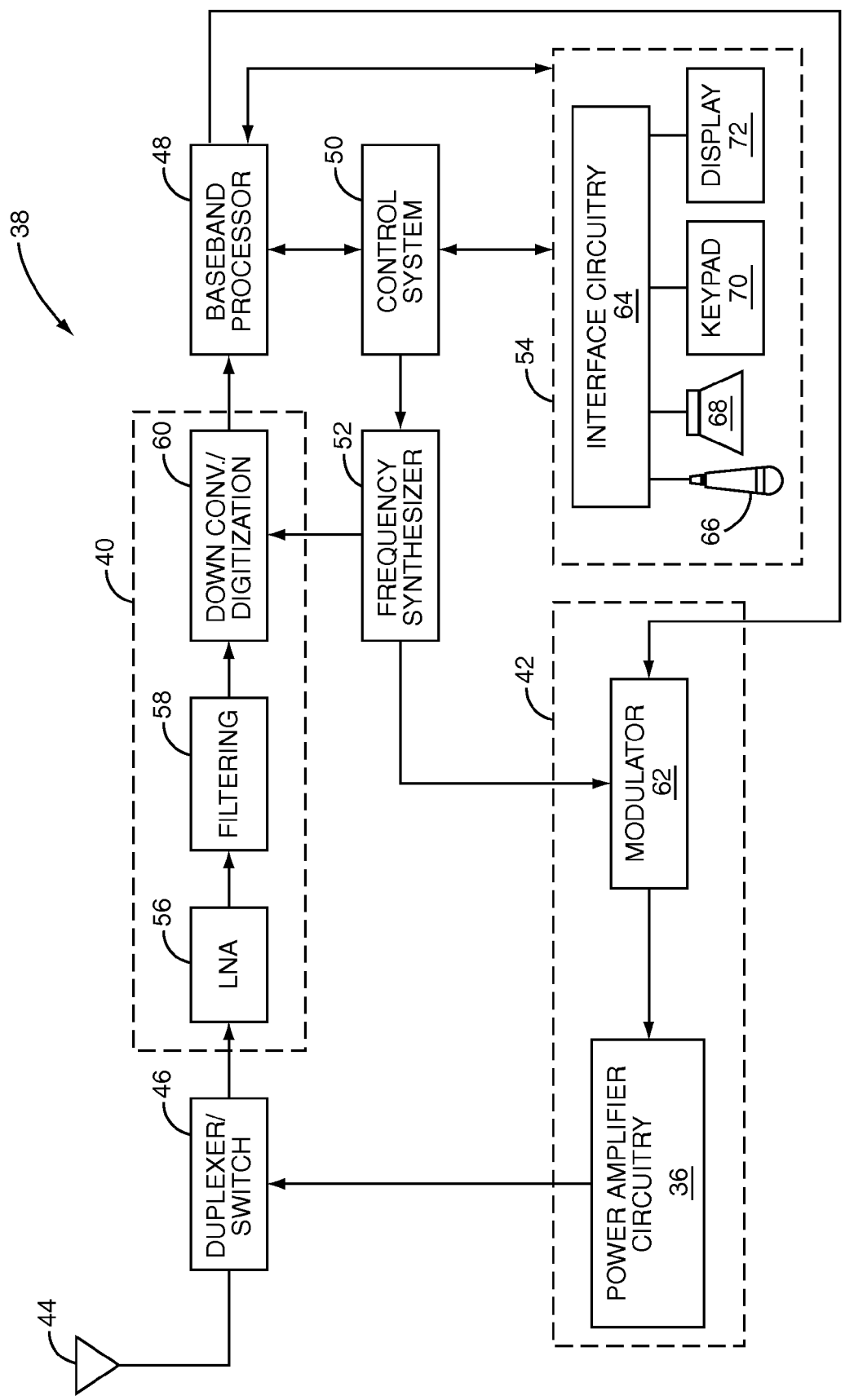
FIG. 5 shows an application example of the present invention used in a mobile terminal.

An application example of a quadrature RF power amplifier is its use in power amplifier circuitry 36 in a mobile terminal 38. The basic architecture of the mobile terminal 38 is represented in FIG. 5 and may include a receiver front end 40, a radio frequency transmitter section 42, an antenna 44, a duplexer or switch 46, a baseband processor 48, a control system 50, a frequency synthesizer 52, and an interface 54. The receiver front end 40 receives information bearing radio frequency signals from one or more remote transmitters provided by a base station. A low noise amplifier (LNA) 56 amplifies the signal. A filter circuit 58 minimizes broadband interference in the received signal, while down conversion and digitization circuitry 60 down converts the filtered, received signal to an intermediate or baseband frequency signal, which is then digitized into one or more digital streams. The receiver front end 40 typically uses one or more mixing frequencies generated by the frequency synthesizer 52. The baseband processor 48 processes the digitized received signal to extract the information or data bits conveyed in the received signal. This processing typically comprises demodulation, decoding, and error correction operations. As such, the baseband processor 48 is generally implemented in one or more digital signal processors (DSPs).

On the transmit side, the baseband processor 48 receives digitized data, which may represent voice, data, or control information, from the control system 50, which it encodes for transmission. The encoded data is output to the transmitter 42, where it is used by a modulator 62 to modulate a carrier signal that is at a desired transmit frequency. The power amplifier circuitry 36 amplifies the modulated carrier signal to a level appropriate for transmission, and delivers the amplified and modulated carrier signal to the antenna 44 through the duplexer or switch 46.

A user may interact with the mobile terminal 38 via the interface 54, which may include interface circuitry 64 associated with a microphone 66, a speaker 68, a keypad 70, and a display 72. The interface circuitry 64 typically includes analog-to-digital converters, digital-to-analog converters, amplifiers, and the like. Additionally, it may include a voice encoder/decoder, in which case it may communicate directly with the baseband processor 48. The microphone 66 will typically convert audio input, such as the user's voice, into an electrical signal, which is then digitized and passed directly or indirectly to the baseband processor 48. Audio information encoded in the received signal is recovered by the baseband processor 48, and converted by the interface circuitry 64 into an analog signal suitable for driving the speaker 68. The keypad 70 and display 72 enable the user to interact with the mobile terminal 38, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) reflection cancellation circuit comprising:
    an RF directional combiner adapted to:
        receive a power amplifier output signal;
        provide a first RF output signal based on the power amplifier output signal;
        receive a first reflected RF output signal;
        receive an amplified phase-shifted cancellation signal; and
        combine the amplified phase-shifted cancellation signal with the first reflected RF output signal to substantially cancel the amplified phase-shifted cancellation signal and the first reflected RF output signal;
    an RF directional splitter adapted to:
        receive the first RF output signal;
        provide a second RF output signal based on the first RF output signal;
        receive a second reflected RF output signal based on the second RF output signal; and
        split the second reflected RF output signal into a cancellation signal and the first reflected RF output signal; and
    RF amplifier and phase-shift circuitry adapted to:
        receive the cancellation signal; and
        amplify and phase-shift the cancellation signal to provide the amplified phase-shifted cancellation signal.

2. The RF reflection cancellation circuit of claim 1 wherein the RF amplifier and phase-shift circuitry further comprises:
    a phase-shift circuit adapted to:
        receive the cancellation signal; and
        phase-shift the cancellation signal to provide a phase-shifted cancellation signal; and
    an RF amplifier adapted to:
        receive the phase-shifted cancellation signal; and
        amplify the phase-shifted cancellation signal to provide the amplified phase-shifted cancellation signal.

3. The RF reflection cancellation circuit of claim 2 wherein the RF directional combiner, the RF directional splitter, and the phase-shift circuit are provided by a dual directional coupler.

4. The RF reflection cancellation circuit of claim 3 wherein the dual directional coupler further comprises:
    a first main port adapted to receive the power amplifier output signal;
    a second main port adapted to provide the second RF output signal, and to receive the second reflected RF output signal;
    a first directional port adapted to receive the amplified phase-shifted cancellation signal; and
    a second directional port adapted to provide the phase-shifted cancellation signal.

5. The RF reflection cancellation circuit of claim 2 wherein the RF directional combiner, the RF directional splitter, and the phase-shift circuit are provided by a first directional coupler and a second directional coupler.

6. The RF reflection cancellation circuit of claim 5 wherein:
    the first directional coupler further comprises:
        a first main port adapted to receive the power amplifier output signal;
        a second main port adapted to provide the first RF output signal and receive the first reflected RF output signal; and
        a first directional port adapted to receive the amplified phase-shifted cancellation signal; and
    the second directional coupler further comprises:
        a third main port adapted to receive the first RF output signal and provide the first reflected RF output signal;
        a fourth main port adapted to provide the second RF output signal and to receive the second reflected RF output signal; and
        a second directional port adapted to provide the phase-shifted cancellation signal.

7. The RF reflection cancellation circuit of claim 1 wherein the RF amplifier and phase-shift circuitry further comprises:
    an RF amplifier adapted to:
        receive the cancellation signal; and
        amplify the cancellation signal to provide an amplified cancellation signal; and
    a phase-shift circuit adapted to:
        receive the amplified cancellation signal; and
        phase-shift the amplified cancellation signal to provide the amplified phase-shifted cancellation signal.

8. The RF reflection cancellation circuit of claim 7 wherein the RF directional combiner, the RF directional splitter, and the phase-shift circuit are provided by a dual directional coupler.

9. The RF reflection cancellation circuit of claim 8 wherein the dual directional coupler further comprises:
    a first main port adapted to receive the power amplifier output signal;
    a second main port adapted to provide the second RF output signal, and to receive the second reflected RF output signal;
    a first directional port adapted to receive the amplified cancellation signal; and
    a second directional port adapted to provide the cancellation signal.

10. The RF reflection cancellation circuit of claim 7 wherein the RF directional combiner, the RF directional splitter, and the phase-shift circuit are provided by a first directional coupler and a second directional coupler.

11. The RF reflection cancellation circuit of claim 10 wherein:
the first directional coupler further comprises:
a first main port adapted to receive the power amplifier output signal;
a second main port adapted to provide the first RF output signal and receive the first reflected RF output signal; and
a first directional port adapted to receive the amplified cancellation signal; and
the second directional coupler further comprises:
a third main port adapted to receive the first RF output signal and provide the first reflected RF output signal;
a fourth main port adapted to provide the second RF output signal and to receive the second reflected RF output signal; and
a second directional port adapted to provide the cancellation signal.

12. The RF reflection cancellation circuit of claim 1 wherein the RF directional combiner further comprises a first main input adapted to receive the power amplifier output signal and having a first main input impedance, wherein the first main input impedance is substantially unchanged in the presence of changes in an amplitude of the second reflected RF output signal.

13. The RF reflection cancellation circuit of claim 1 wherein the second RF output signal is substantially equal in amplitude, frequency, and phase to the power amplifier output signal.

14. The RF reflection cancellation circuit of claim 1 wherein the second reflected RF output signal is based on a reflection of the second RF output signal.

15. The RF reflection cancellation circuit of claim 1 wherein an amplifier gain is equal to an amplitude of the amplified phase-shifted cancellation signal divided by an amplitude of the cancellation signal, wherein the amplifier gain is greater than 1.7.

16. The RF reflection cancellation circuit of claim 1 wherein a coupling coefficient is equal to an amplitude of the second reflected RF output signal divided by an amplitude of the cancellation signal, wherein the coupling coefficient is greater than 1.7.

17. The RF reflection cancellation circuit of claim 16 wherein an amplifier gain is equal to an amplitude of the amplified phase-shifted cancellation signal divided by an amplitude of the cancellation signal, wherein the amplifier gain is approximately equal to two times the coupling coefficient.

18. The RF reflection cancellation circuit of claim 17 wherein the coupling coefficient is approximately equal to 15 db and the amplifier gain is approximately equal to 30 db.

19. The RF reflection cancellation circuit of claim 1 wherein the amplified phase-shifted cancellation signal is phase-shifted approximately 180 degrees from the cancellation signal.

* * * * *